July 21, 1953 H. A. INGALLS 2,646,012
DEVICE FOR LIQUID TREATMENT OF SOIL
Filed Dec. 24, 1948 2 Sheets-Sheet 1
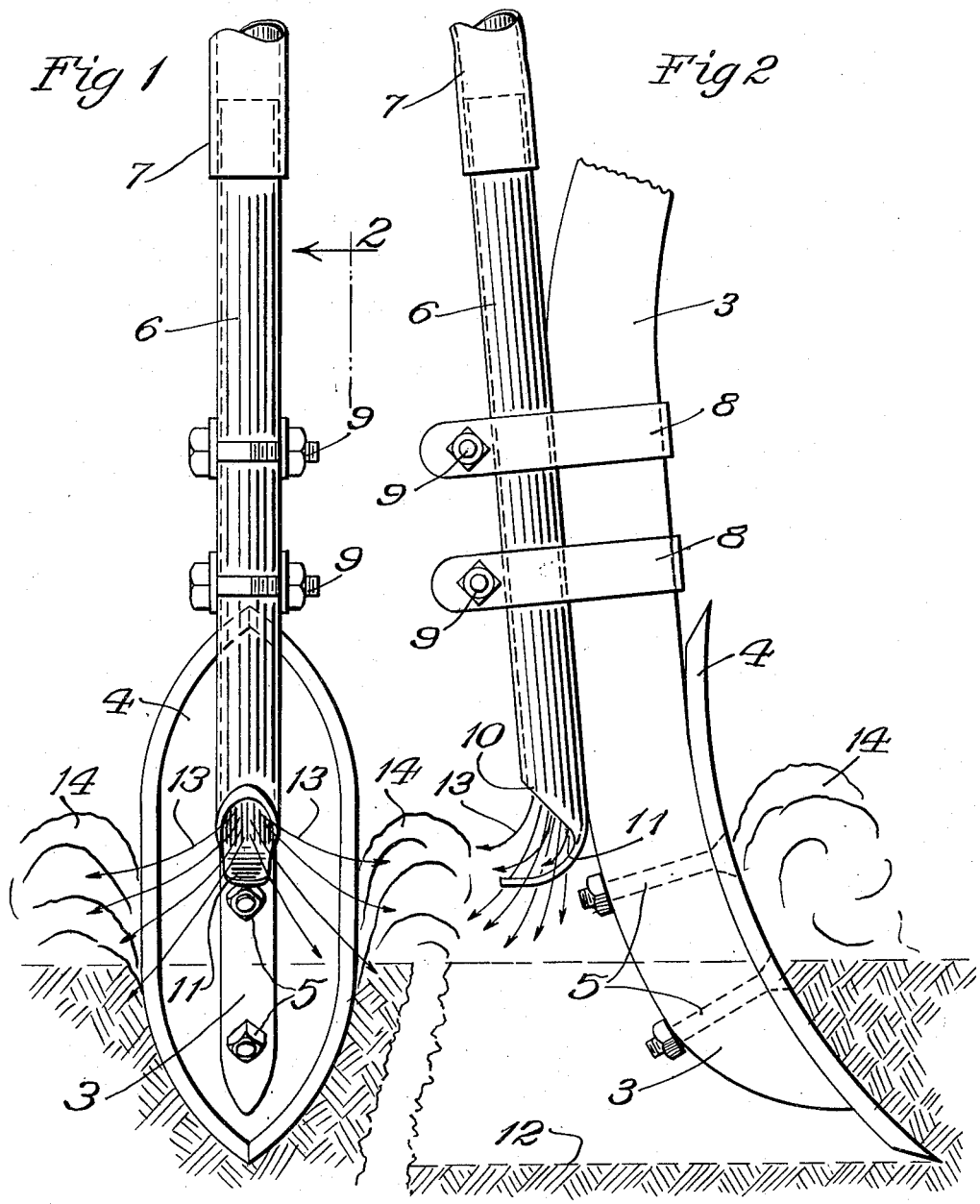
Inventor
Henry A. Ingalls
By: Attorneys July 21, 1953 H. A. INGALLS 2,646,012
DEVICE FOR LIQUID TREATMENT OF SOIL
Filed Dec. 24, 1948 2 Sheets-Sheet 2
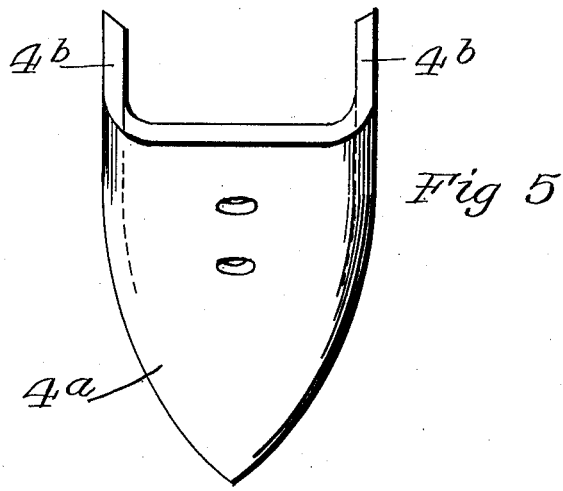
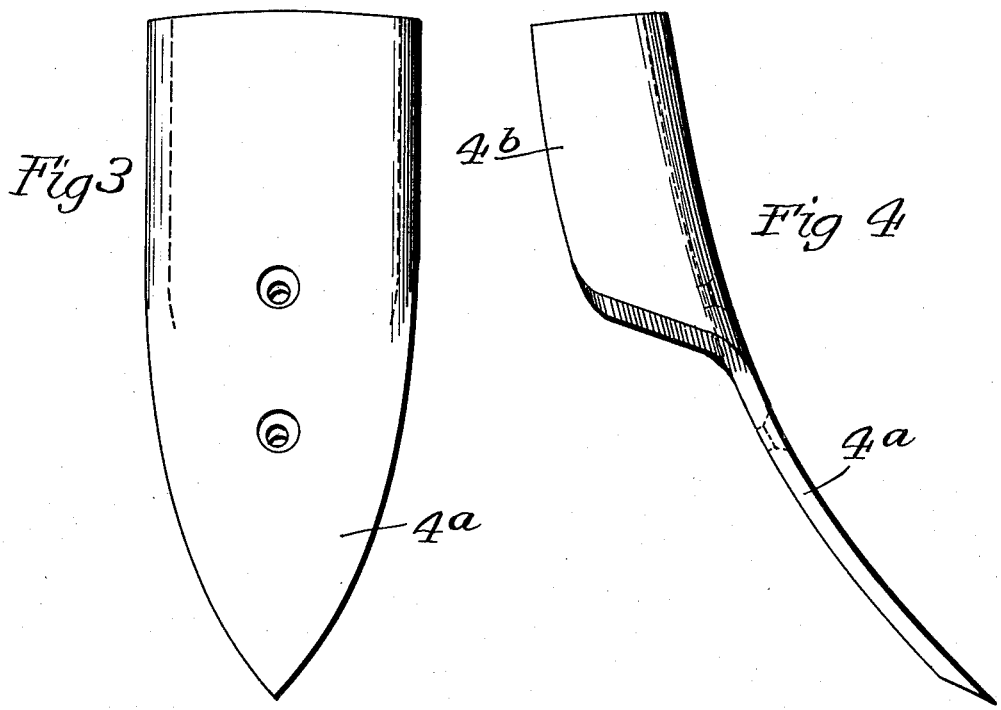
Inventor:
Henry A. Ingalls
By: Shier & Shier
Attorneys Patented July 21, 1953

2,646,012

UNITED STATES PATENT OFFICE 2,646,012

DEVICE FOR LIQUID TREATMENT OF SOIL

Henry A. Ingalls, Wasco, Calif.

Application December 24, 1948, Serial No. 67,169

1 Claim. (Cl. 111—7)

This invention relates to a device for sub-soil liquid treatment or saturation, and one of its objects is to provide improved means for visibly discharging a suitable liquid on the faces of a furrow or trench and surface which is being dug by a scarifier or furrow-opening blade of the device.

Another object is to provide a liquid discharge tube with a non-clogging liquid spreader at its discharge end whereby the liquid is visibly spread or sprayed upon the bottom and sides of the furrow or trench and surface prior to being compacted.

Another object is to provide means for adjusting the height of the liquid discharge tube with respect to the scarifier or furrow-opening blade.

Other objects and advantages will appear in the course of this specification and, with said objects and advantages in view, this invention consists in the several novel features hereinafter fully set forth and more particularly defined in the appended claim.

The invention is clearly illustrated in the drawing accompanying this specification, in which:

Fig. 1 is a rear elevation of a device for subsoil liquid treatment or saturation embodying a simple form of the present invention;

Fig. 2 is a side elevation thereof looking in the direction of the arrow 2 in Fig. 1;

Fig. 3 is a front elevation of a modified form of scarifier blade;

Fig. 4 is a side elevation thereof; and

Fig. 5 is a plan thereof.

Referring to said drawing, the reference character 3 designates a tool standard or arm of an implement to which is secured a scarifying or furrow-opening blade 4 as by bolts and nuts 5. The implement (not shown) is provideed with a plurality of arms and scarifying or furrow-opening blades for simultaneously digging a plurality of furrows or trenches in the soil. The arms may be mounted on the frame of the implement, as shown and described in my prior application for patent, Serial No. 793,200, filed December 22, 1947. The scarifying blade 4 may be pointed at its top and bottom and is bowed rearwardly therefrom, as shown in Fig. 2.

Adjustably secured to the arm 3 is a liquid discharge or conducting tube 6, to the upper end of which is secured a flexible tubular connection 7 which leads from a suitable tank (not shown) for containing the liquid which is to be visibly applied to the faces of the furrow or trench. As shown, the discharge or conducting tube is secured to the arm 3 by a pair of U-shaped clamps 8, which extend around the arm and discharge or conducting tube with the ends of the clamps fastened upon the arm and discharge or conducting tube by bolts and nuts 9, or their equivalents.

The lower end of the conducting tube 6 has a discharge opening 10 which faces rearwardly and downwardly and from said lower end of the tube a lip 11 extends rearwardly under said discharge opening which serves to spread or spray the liquid rearwardly and laterally towards the faces of the furrow or trench 12 prior to compaction or filling in of the soil. The arrows 13 indicate the direction in which the liquid is spread by the lip 11, and the lines 14 indicate the soil which has been turned up to form the furrow or trench.

In the modified form of scarifier or furrow-opening blade, shown in Figs. 3 to 5 inclusive, the blade 4a is given substantially the same curvature as that shown in Fig. 2. Adjacent its upper end, wings 4b extend rearwardly from the side edges and serve to temporarily hold back the soil which has been thrown up by the blade, thereby retarding the folding in of the soil until released by the wings, and giving longer visibility to the spray.

The device has many uses in the treatment of sub-soil, among which is road building, preferably on sandy, wet soil. When used for building roads, oil is discharged upon the damp faces of the furrows or trenches, after which the upturned soil is surface planed and compacted so as to make a smooth pavement. Other uses are to stabilize dikes, like contour irrigation check; to make easy, cheap, deep, moisture-resistant compaction; to plant remedies for plant enemies; to irrigate; to avoid evaporation loss; to plant liquid fertilizers; to plant liquid neutralizing alkalies; to plant liquids as, for example, crude oil for permanently water-proofing areas like floors, walks, and pavements; for moisture-proofing stock piles of soil for walls, roofs of buildings, and the like; and for moistureproofing soil to be stock-piled for transportation for such use as patching pavements and correcting grades.

With the use of the lip or spreader 11, the liquid may be sprayed for paving, stabilization, or for embankments to prevent washouts; also liquid saturation of soil agriculturally, such as sub-irrigation, etc.

Having thus described my invention, it is obvious that various immaterial modifications may be made in the same without departing from the spirit of my invention: hence, I do not wish to be understood as limiting myself to the exact form, construction, arrangement, and combination of parts herein shown and described or uses mentioned.

What I claim as new and desire to secure by Letters Patent is:

A device for liquid treatment of soil comprising in combination, a generally vertical depending arm mounted for movement across the soil, a furrow-opening blade substantially wider than said arm secured to the lower end thereof, a generally vertical liquid conducting tube having a discharge opening at its lower end, means for adjustably supporting said tube on the rear of said arm behind said blade with the lower end of said tube intermediate the ends of said blade and disposed above the level of the normal soil surface when said blade is in furrow-opening position, said discharge opening facing rearwardly and downwardly, and a spreader including a rearwardly extending curved lip fixed to the lower end of said tube under and contiguous to said discharge opening for developing a rearwardly and laterally directed spray from the liquid conducted by said tube for liquid treatment of the faces of the furrow formed by said blade; the width of said lip being less than that of said discharge opening, whereby a non-clogging liquid spreader is formed.

HENRY A. INGALLS.

References Cited in the file of this patent

UNITED STATES PATENTS

| Number | Name | Date |
|---|---|---|
| 62,006 | Clark | Feb. 12, 1867 |
| 452,245 | Szarkowski | Mar. 12, 1891 |
| 555,897 | Crane | Mar. 3, 1896 |
| 1,038,084 | Carroll | Sept. 10, 1912 |
| 1,263,111 | Reichelt | Apr. 16, 1918 |
| 1,273,694 | Tyson | July 23, 1918 |
| 1,557,408 | Blankenship | Oct. 13, 1925 |
| 1,564,083 | Lyons | Dec. 1, 1925 |
| 1,799,592 | Lampen | Apr. 7, 1931 |
| 1,807,412 | Ingalls | May 26, 1931 |
| 2,012,566 | Ingalls | Aug. 27, 1935 |
| 2,134,245 | Carswell | Oct. 25, 1938 |
| 2,292,909 | Thoma et al. | Aug. 11, 1942 |
| 2,424,520 | Tonkin | July 22, 1947 |

FOREIGN PATENTS

| Number | Country | Date |
|---|---|---|
| 39,052 | Netherlands | Sept. 15, 1936 |
| 51,176 | Denmark | Jan. 27, 1936 |
| 51,721 | Denmark | June 8, 1936 |
| 103,830 | Australia | Apr. 27, 1938 |
| 118,811 | Australia | Aug. 11, 1944 |
| 335,464 | Germany | Sept. 24, 1921 |
| 864,141 | France | Jan. 13, 1941 |